(No Model.)

C. F. MONROE.
COFFEE OR TEA POT.

No. 416,178. Patented Dec. 3, 1889.

Witnesses
E. D. Smith
A. V. Cushman

Inventor
Charles F. Monroe
by
Arthur W. Harrison
his Attorney

UNITED STATES PATENT OFFICE.

CHARLES F. MONROE, OF MERIDEN, CONNECTICUT.

COFFEE OR TEA POT.

SPECIFICATION forming part of Letters Patent No. 416,178, dated December 3, 1889.

Application filed June 10, 1889. Serial No. 313,679. (No model.)

*To all whom it may concern:*

Be it known that I, CHARLES F. MONROE, of Meriden, in the county of New Haven and State of Connecticut, have invented new and useful Improvements in Coffee or Tea Pots; and I do hereby declare the following to be a full, clear, and exact description of said invention, reference being had to the accompanying drawings, and to the letters or figures of reference marked thereon, which form a part of this specification.

My invention relates to improvements in coffee or tea pots; and my object is to produce a vessel of the kind described partly of metal and partly of vitreous material—such as glass or porcelain—and to construct such vessel so that the vitreous material will not be fractured by sudden changes in temperature, due, for instance, to pouring hot water into the vessel or placing it upon a stove.

The advantage of providing a shell of glass, porcelain, or other similar material outside of the metal vessel is that the visible surface of the complete article is one not liable to rust or tarnish. This outer shell, whether plain or ornamented, is preferable to the ordinary metal; but unless separated from the inner vessel by a space through which air may freely circulate said vitreous shell would be liable to be cracked or broken by the different degrees of temperature to which in use it must be subjected.

My invention therefore consists in providing a coffee or tea pot with an outer shell of vitreous material and providing for the free circulation of air between the walls of the pot and the said shell; and my invention further consists in the construction and combination of parts, as hereinafter described, and pointed out in the claims.

Figure 1:
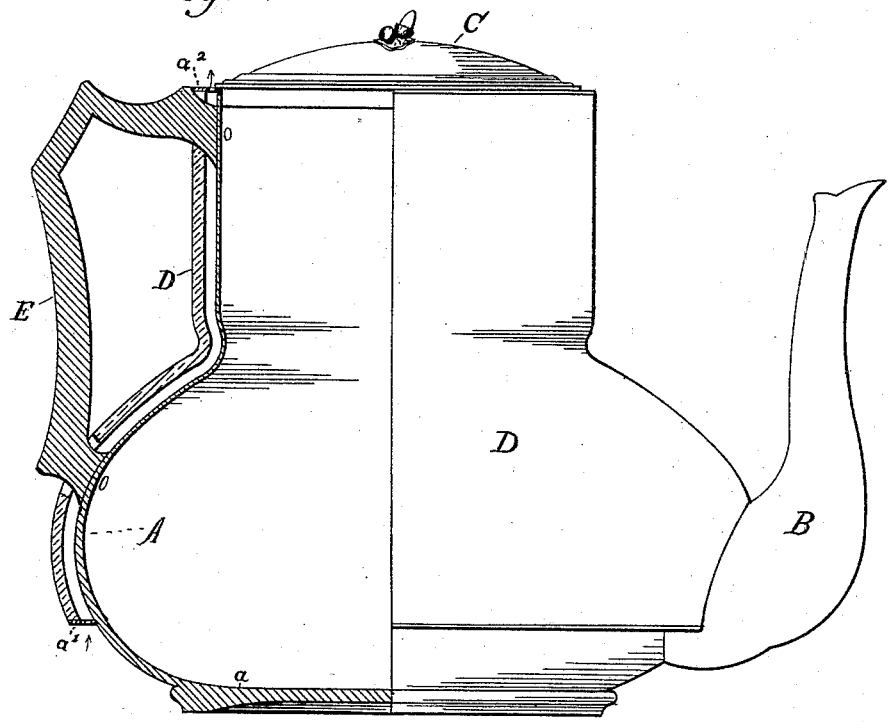
Figure 2:
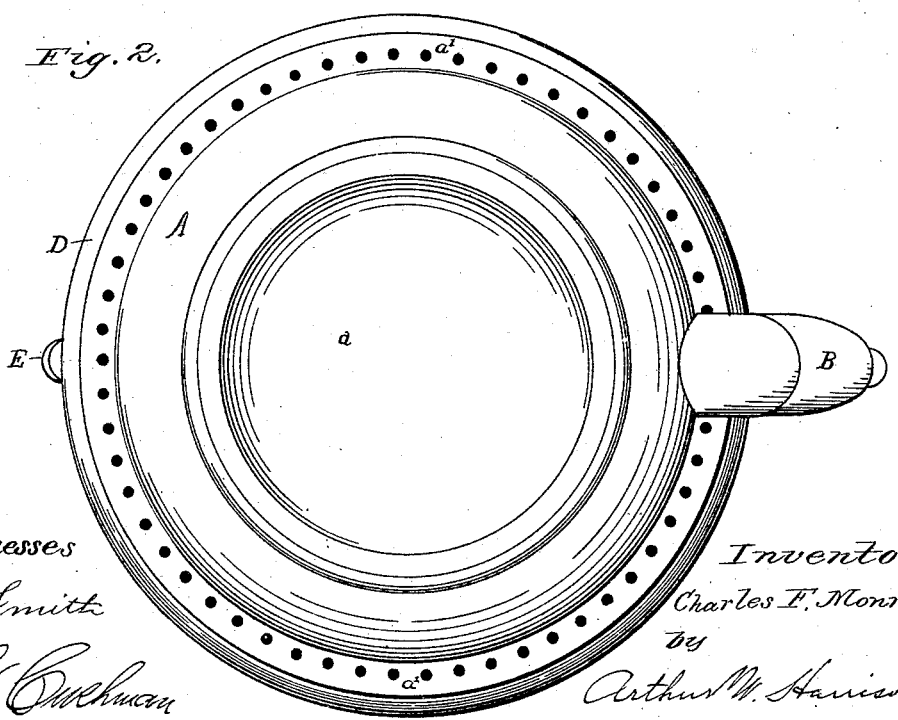

In the drawings which accompany and form a part of this specification, and in which like letters of reference indicate corresponding parts, Figure 1 is a vertical sectional view of a tea-pot, and Fig. 2 is a bottom plan view of the same.

At A is represented a metallic tea-pot, having base $a$ and spout B and lid or cover C. Near the bottom of the pot and surrounding the same is an outwardly-projecting flange $a'$, which is provided with numerous fine perforations for the passage of air, and at the top of the pot is a similar flange $a^2$. The shell D, of a size sufficiently larger than the pot to allow an air-space between them, is held and supported by the said flanges $a'$ and $a^2$.

The handle E may be connected to the pot in any suitable manner—as, for instance, by cutting out portions of the shell to allow the ends of the handle or lugs projecting therefrom to pass through the openings and be secured to the pot by soldering or other suitable means.

Owing to the provision of the air-space and the perforated flanges by means of which a free circulation of air is permitted, there is practically no possibility of fracturing the vitreous shell by sudden changes of temperature.

Having now described my invention, what I claim, and desire to secure by Letters Patent, is—

1. A metallic coffee or tea pot having an outer vitreous shell and means for allowing a free circulation of air between the walls of the pot and the shell, substantially as described.

2. A metallic coffee or tea pot having near its bottom and top the perforated flanges $a'$ and $a^2$, and the outer vitreous shell D, held between the said flanges and separated from the pot by an air-space, substantially as described.

In testimony whereof I affix my signature in presence of two subscribing witnesses.

C. F. MONROE.

Witnesses:
C. H. SAWYER,
CHAS. P. MERWIN.